United States Patent
Livingston

(10) Patent No.: US 9,613,726 B2
(45) Date of Patent: Apr. 4, 2017

(54) SYSTEMS AND METHODS FOR REDUCING THE STORAGE TIME OF SPENT NUCLEAR FUEL

(75) Inventor: Peter Moshchansky Livingston, Palos Verdes Estates, CA (US)

(73) Assignee: NORTHROP GRUMMAN SYSTEMS CORPORATION, Los Angeles, CA (US)

(*) Notice: Subject to any disclaimer, the term of this patent is extended or adjusted under 35 U.S.C. 154(b) by 2191 days.

(21) Appl. No.: 12/473,957

(22) Filed: May 28, 2009

(65) Prior Publication Data
US 2010/0305383 A1 Dec. 2, 2010

(51) Int. Cl.
G21C 19/44 (2006.01)
G21F 9/28 (2006.01)
G21F 9/30 (2006.01)

(52) U.S. Cl.
CPC .......... *G21F 9/28* (2013.01); *G21C 19/44* (2013.01); *G21F 9/30* (2013.01); *Y02W 30/882* (2015.05)

(58) Field of Classification Search
USPC .................. 376/157, 170, 156, 158
See application file for complete search history.

(56) References Cited

U.S. PATENT DOCUMENTS

| | | | |
|---|---|---|---|
| 4,189,686 A * | 2/1980 | Brau et al. | 372/2 |
| 5,513,226 A * | 4/1996 | Baxter et al. | 376/170 |
| 5,966,418 A * | 10/1999 | Magill et al. | 376/170 |
| 6,442,226 B1 * | 8/2002 | Venneri et al. | 376/170 |
| 2002/0169351 A1 * | 11/2002 | Brown | 588/1 |
| 2002/0186805 A1 * | 12/2002 | Soloway | 376/157 |
| 2003/0226401 A1 | 12/2003 | Letovsky | |
| 2005/0155340 A1 | 7/2005 | Letovsky | |

FOREIGN PATENT DOCUMENTS

| WO | WO 00/72329 A2 | 11/2000 |
|---|---|---|
| WO | WO 00/72329 A3 | 11/2000 |

OTHER PUBLICATIONS

Plettner, et al.: "*Proposed Tabletop Laser-Driven Coherent X-Ray Source*"; Proceedings of PAC07, Albuquerque, New Mexico, USA; TUPMS069; IEEE 2007; pp. 1332-1334.

Plettner, et al.: "*Proposed Dielectric-Based Microstructure Laser-Driven Undulator*"; Physical Review Special Topics—Accelerators and Beams; 2008 The American Physical Society; pp. 030704-1-030704-10.

Wiggins, et al.: "*Progress Toward a Laser-Driven X-Ray Free-Electron Laser*"; SPIE; Newsroom; 10.1117/2.1200903.1559; pp. 1-3.

Katsouleas, et al.: "*A Proposal for a 1 GeV Plasma-Wakefield Acceleration Experiment at Slac*"; 1998 IEEE; pp. 687-689.

* cited by examiner

*Primary Examiner* — Sean P Burke
(74) *Attorney, Agent, or Firm* — Tarolli, Sundheim, Covell & Tummino LLP

(57) ABSTRACT

Systems and methods are provided for reducing the storage time of spent nuclear fuel. In one embodiment, a method is provided that includes providing a sample of spent nuclear fuel and irradiating the spent nuclear fuel with substantially collimated gamma ray photons having energy levels of about 10 MeV to about 15 MeV for a predetermined time period to initiate a photofission reaction in the remaining fertile fissile material in the spent nuclear fuel.

13 Claims, 6 Drawing Sheets

SYSTEMS AND METHODS FOR REDUCING THE STORAGE TIME OF SPENT NUCLEAR FUEL

TECHNICAL FIELD

The present invention relates generally to nuclear fuel, and specifically to systems and methods for reducing the storage time of spent nuclear fuel.

BACKGROUND

Spent nuclear fuel rods and other spent nuclear materials, if not reprocessed, require storage for about 100,000 years until their radioactivity abates. No one is willing to guarantee that any geologic formation is absolutely stable for that period of time. Thus at present in the United States alone there is ~45,500 metric tonnes of spent fuel rods cumulated after 40 years cooling in large water-filled cooling pools near operating reactors. This burden of nuclear waste will become largely unsustainable because the cooling ponds are not designed as facilities to permanently store the rods. European states, such as France, reprocess their fuel rods to recover fissile atoms such as unburned 235U and 239Pu. While that works for a while, there seems to be a limit of about three reprocessing passes before the spent rod becomes too contaminated with neutron absorbers. Reprocessing was ruled out in this country by President Carter because it recovers plutonium and therefore, represents a proliferation hazard. Chemical separation is a possibility, but it is extremely hazardous because of the intense radioactivity of the daughter products. There are two epochs that dominate spent rod storage—daughter product radioactivity and actinide/transuranic radioactivity. If the latter can be eliminated, the total storage time required would be reduced by at least two possibly three orders of magnitude.

Each 1000 MW nuclear power station in the U.S. produces about 30 metric tonnes of high level radioactive waste per year. There are about 104 U.S. nuclear power plants accounting for 20% of our electrical power that generate roughly 3,120 metric tonnes of spent fuel rods a year. The Department of Energy recently cancelled the Yucca Mountain Storage facility, and Secretary Chu has formed an esteemed commission to search for alternatives. But at present there is no means established for fuel rod disposal apart from the cooling pools at each power plant. Clearly opposition to the Yucca Mountain facility was centered on the stability of that formation over a significant geologic time (100,000 years).

Nuclear waste storage times over hundreds to a thousand years appear to have little opposition. Although nuclear power plant safety remains an issue in some minds, removal of the storage problem will be the great enabler of fission nuclear power—an available, reliable, constant, greenhouse gas-free power source. Naturally if the restrictions on nuclear power plant construction were removed by showing a clear and safe path for fuel rod treatment and storage, a large number of new jobs will be created and nuclear component industries such as N-rated precision valves as an example will be re-invigorated. More and better power plants will require improvement and better control of the national power grid and also provide a source of new jobs and industries.

SUMMARY

In accordance with an aspect a method is providing of reducing the storage time of spent nuclear fuel. The method comprises providing a sample of spent nuclear fuel and irradiating the spent nuclear fuel with substantially collimated gamma ray photons having energy levels of about 10 MeV to about 15 MeV for a predetermined time period to initiate a photofission reaction in the remaining fertile fissile material in the spent nuclear fuel.

In accordance with an aspect of the present invention, a method of reducing the storage time of spent nuclear fuel rods is provided. The method comprises placing a spent nuclear fuel rod in a nuclear reactor with a plurality of active nuclear fuel rods and a plurality of control rods and removing one or more of the plurality of control rods until the reactor reaches near criticality. The method further comprises irradiating the spent nuclear fuel with substantially collimated gamma ray photons having energy levels of about 10 MeV to about 15 MeV for a predetermined time period to initiate a photofission reaction in the remaining fertile fissile material in the spent nuclear fuel rod.

In accordance with yet a further aspect of the invention, a system is provided for reducing the storage time of spent nuclear fuel. The system comprises a chamber configured to hold a sample of spent nuclear fuel and a gamma ray free electron laser (FEL) spaced apart from the nuclear reactor and positioned to irradiate the spent nuclear fuel with substantially collimated gamma ray photons having energy levels of about 10 MeV to about 15 MeV for a predetermined time period to initiate a photofission reaction in the remaining fertile fissile material in the spent nuclear fuel.

DETAILED DESCRIPTION

Systems and methods are disclosed for reducing the radioactivity lifetime and thus the storage time of spent nuclear fuel. The systems and methods employ a gamma ray free electron laser (FEL) that can provide photons having energies of about 10 MeV to about 15 MeV to irradiate the spent nuclear fuel with gamma photons that penetrate the spent nuclear fuel in portions of the spent nuclear fuel that are inaccessible to thermal neutrons. The irradiation initiates a photofission reaction in the remaining fertile fissile material in the rod such as actinides (unused $^{235}$U, formed $^{239}$Pu, $^{241}$PU) in addition to other transuranics that are present in the spent nuclear fuel. This can reduce the storage time of the spent nuclear fuel from approximately $10^5$ years to approximately $10^3$ years or less.

The spent nuclear fuel can be spent nuclear fuel rods. The major neutron absorbers that block the fission process in spent nuclear fuel rods are highly concentrated at or near the cylindrical surface of the rod and have substantially no effect on gamma ray penetration into the fuel rod in a direction along the longitudinal axis of the fuel rod. The gamma ray FEL differs from other sources of gamma ray photons in that it provides near collimation and has a relatively narrow energy spectrum. Therefore, the gamma ray FEL can be positioned to provide collimated photons having energies of about 10 MeV to about 15 MeV along the longitudinal axis of the nuclear spent fuel rod.

In one aspect of the present invention, a spent nuclear fuel rod can be inserted into an active pile of nuclear fuel rods to act as an inefficient control rod in a light water pile nuclear reactor that can generate energy that can also be used to power the laser while the laser is irradiating the spent nuclear fuel rod. The active control rods and the photofission reaction induced by the 10-15 MeV gamma ray FEL provide a fission gain (i.e., chain fission reaction) that can be controlled to increase the fission of the remaining fissile material in the spent nuclear fuel rods at a reasonable rate (e.g., 1-10 hours) such that the spent rods can be processed faster than depletion of the active fuel rods.

Figure 1:
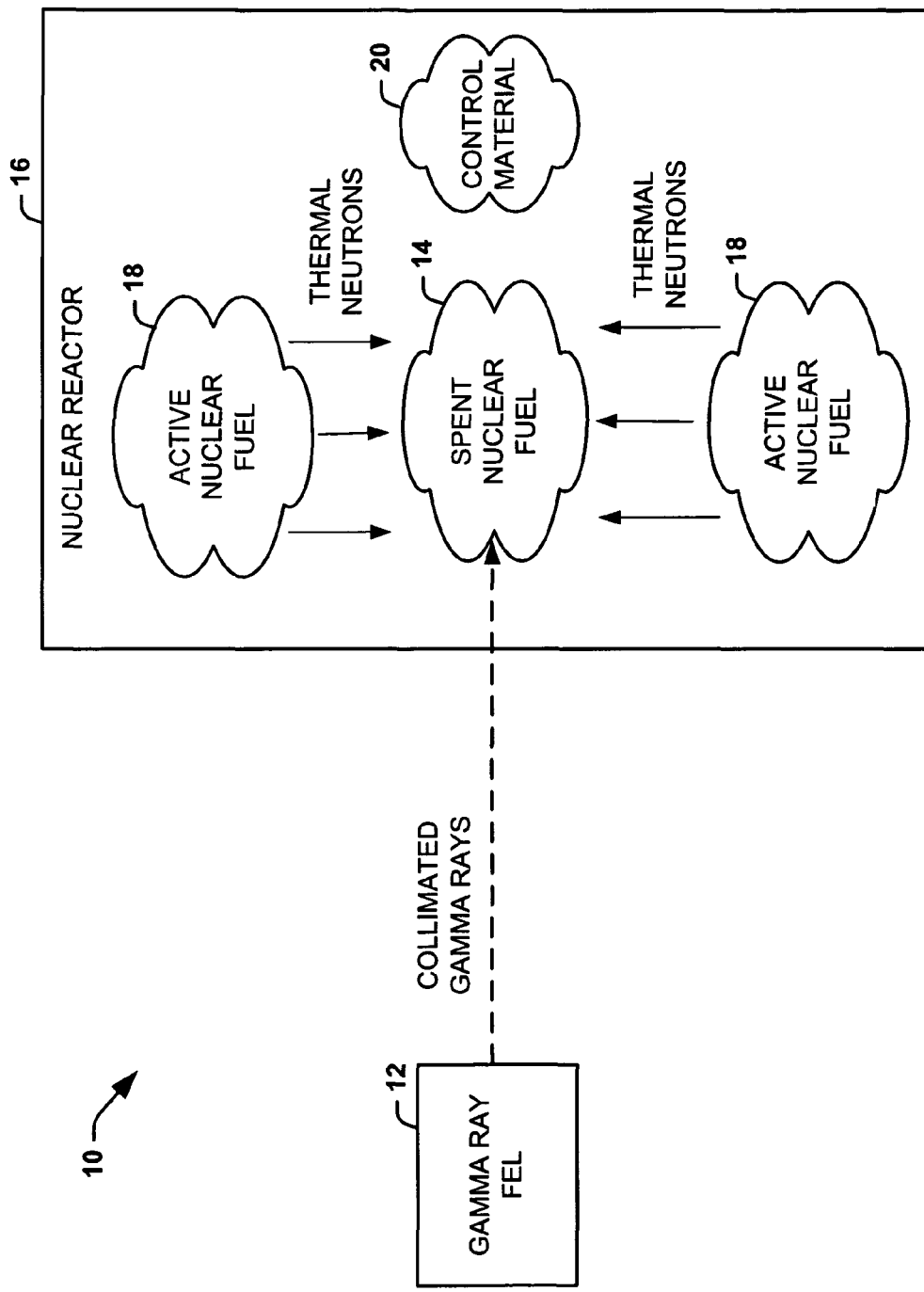
FIG. 1 illustrates a block diagram of a system for reducing the storage time of spent nuclear fuel in accordance with an aspect of the invention.

FIG. 1 illustrates a system 10 for reducing the storage time of spent nuclear fuel in accordance with an aspect of the present invention. A sample of spent nuclear fuel 14 is disposed in a chamber, for example, a nuclear reactor 16. The spent nuclear fuel 14 can be a spent nuclear fuel rod, radioactive material removed from a spent nuclear fuel rod or other spent nuclear fuel from another source. A gamma ray FEL that provides photons with energies of about 10 MeV to about 15 MeV is positioned to irradiate the spent nuclear fuel 14 with collimated gamma rays for a predetermined time period. The nuclear reactor 16 can include active nuclear fuel 18 and control material 20 that is employed to absorb the thermal neutrons generated by the active nuclear fuel 18. An amount of control material 20 is removed from the nuclear reactor 16 until the nuclear reactor 16 is brought near criticality, so as to keep the production of new fissile material to a minimum The substantially collimated gamma beam irradiates the spent nuclear fuel 14 with gamma photons that penetrate the spent nuclear fuel in portions of the spent nuclear fuel that are nearly inaccessible to the thermal neutrons because of the local thermal neutron absorber concentration. The irradiation initiates a photofission reaction in the remaining fertile fissile material (actinides/transuranics) in the spent nuclear fuel 14 that are present in the spent nuclear fuel 14. The thermal neutrons generated by the active nuclear fuel 18 and the photofission reaction induced by the 10-15 MeV gamma ray FEL 12 provide a fission gain (i.e., chain fission reaction) that can be controlled to increase the fission of the remaining fissile material in the spent nuclear fuel at a reasonable rate such that the spent nuclear fuel 14 can be processed faster than depletion of the active nuclear fuel 18.

Figure 2:
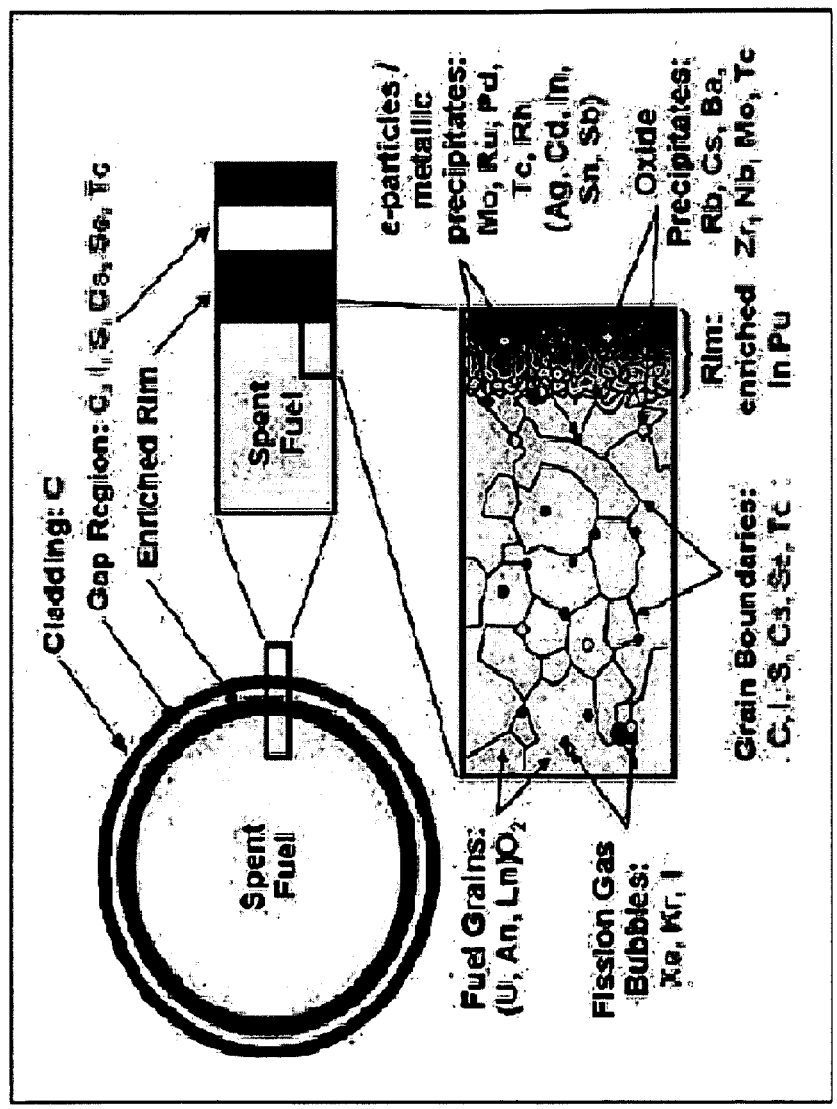
FIG. 2 illustrates a schematic illustration of graph that shows the microstructure and the distribution of actinides and fission products of a spent nuclear fuel rod.

It is to be appreciated that the systems and methods of the present invention can be employed to reduce the storage time of spent nuclear fuel rods employed at nuclear power plants without any separation process of the radioactive material in the spent nuclear fuel rod. FIG. 2 illustrates a schematic illustration of graph 24 that shows the microstructure and the distribution of actinides and fission products of a spent nuclear fuel rod. A nuclear spent fuel rod does not have a uniform distribution of neutron-absorber poisons. The neutron-absorber poisons are distributed where the highest thermal neutron flux was located—at or near the cylindrical surface of the rod. Moreover, at least in the case of light water reactors using LEU (low-enriched uranium—a mixture of about 4~5% of $^{235}UO_2$ with 95% $^{238}UO_2$), the uranium oxide is in the form of ceramic pellets encased in a metal sleeve (zirconium alloy). With use this ceramic becomes crazed with many fine-line cracks increasing in density towards the pellet rim, resulting from, among other things, the high thermal stress the pellet is subjected. The two major neutron absorbers (poisons) are xenon and samarium. As a result of crazing, a spent rod may release quite a bit of xenon over a period of weeks or months after being retired from an active pile. Thus it is stable samarium's concentration that largely determines the thermal neutron penetrability in a spent rod. Therefore both plutonium along with other fissile atoms and samarium, have roughly the same concentration profile with possibly a bump in the middle of the rod for the fissile atoms as a result of thermal neutron shielding.

Figure 3:
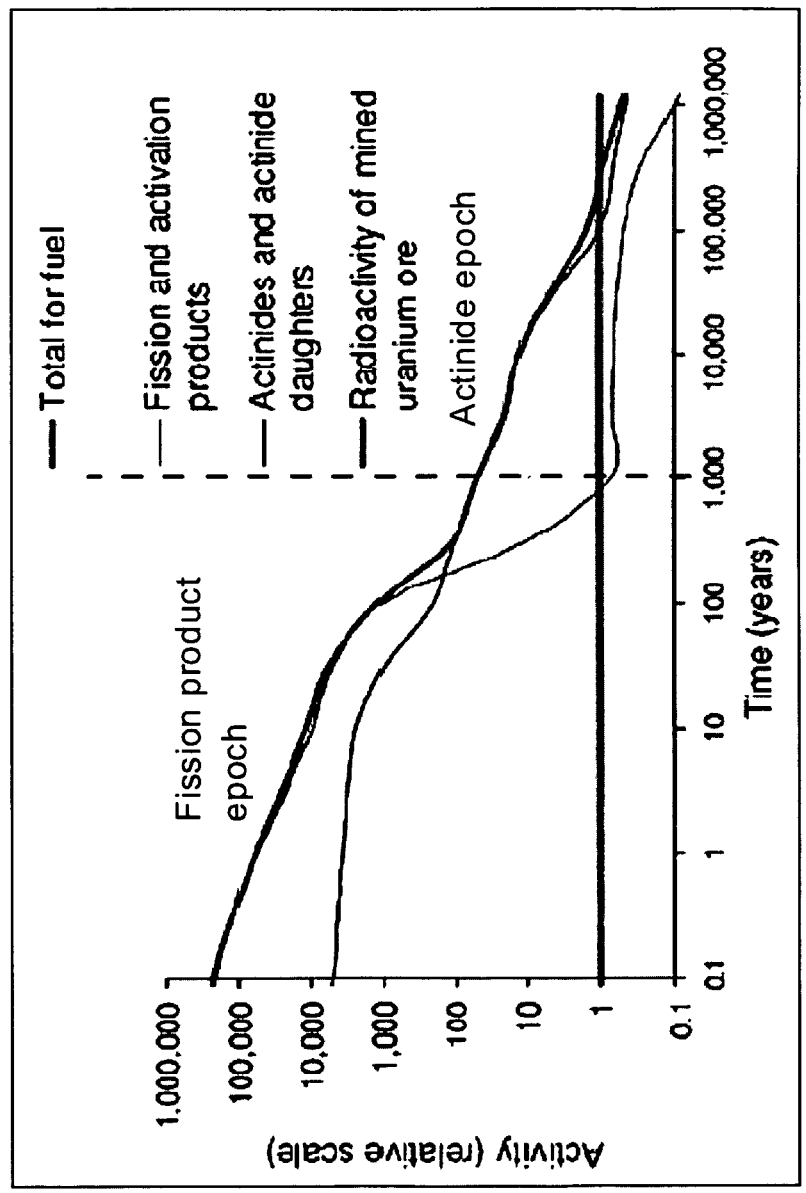
FIG. 3 illustrates a graph of relative radioactivity of spent nuclear fuel versus time (years).

Each spent rod has, on average about $10^{23}$ fissile atoms of all kinds remaining. These contribute to a long-lived radioactivity tail. FIG. 3 illustrates a graph 26 of relative radioactivity of spent nuclear fuel versus time (years). According to the graph 26, storage times can be roughly divided into a fission product epoch and an actinide and transuranics epoch. Without the actinide tail, storage times could be reduced to a little less than a 1000 years. After that time, the spent rod would be about as radioactive as mined uranium ore. A 10 MeV-15 MeV collimated source of gamma ray photons will induce photofission in odd uranium and plutonium isotopes. Since it is presumed that the thermal poisons have a small cross section (of the order of millibarns), their distribution will have substantially no effect on the gamma ray penetration into the fuel rod in a direction along its longitudinal axis. Thus the gamma ray beam will fission atoms in some annulus about the center made inaccessible to thermal neutrons.

Figure 4:
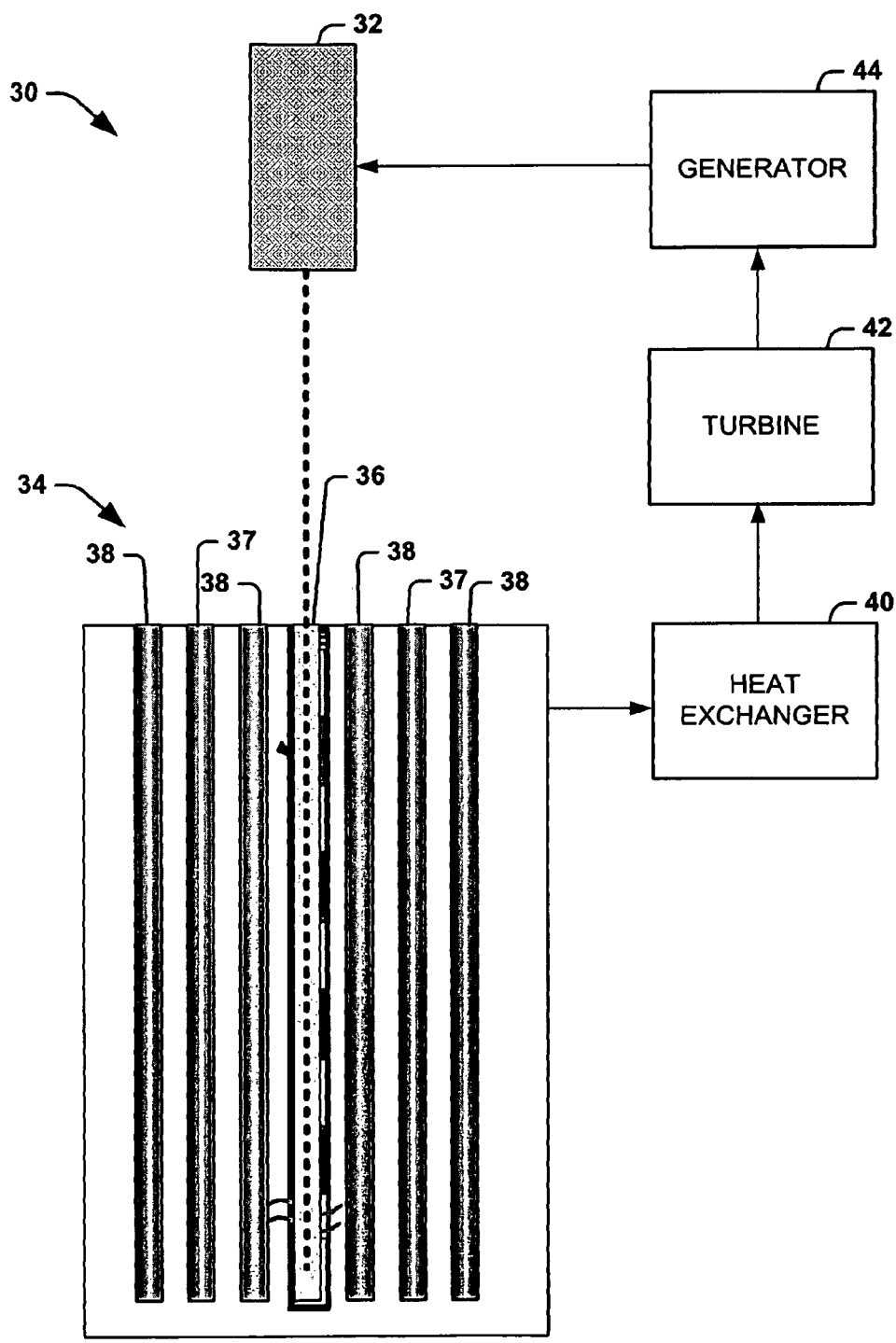
FIG. 4 illustrates a block diagram of a system for reducing the storage time of spent nuclear fuel rods in accordance with an aspect of the invention
Figure 5:
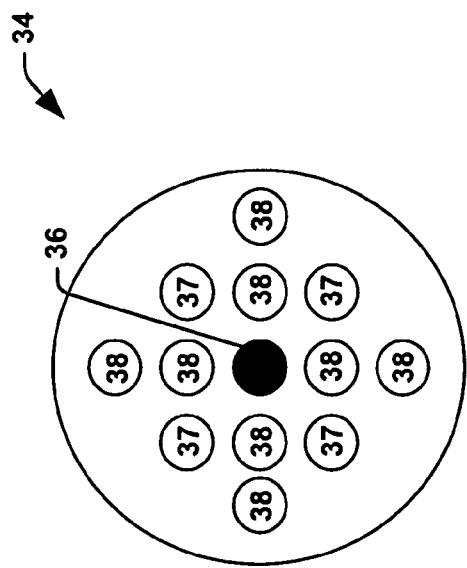
FIG. 5 illustrates a top cross-sectional view of the nuclear reactor of FIG. 4.

FIG. 4 illustrates a system 30 for reducing the storage time of spent nuclear fuel rods in accordance with an aspect of the present invention. The system 30 includes a gamma ray FEL 32 spaced apart from a light water pile nuclear reactor 34. The gamma ray FEL 32 is configured to provide substantially collimated gamma photons at energies of about 10 MeV to about 15 MeV. FIG. 5 illustrates a top cross-sectional view of the nuclear reactor 34 of FIG. 4. A spent nuclear fuel rod 36 is disposed in a central region of the nuclear reactor 34 surrounded by a plurality of active nuclear control rods 38 and a plurality of control rods 37 that absorb thermal neutrons. The spent rod 36 can act as an inefficient control rod. The gamma ray FEL 32 is aligned along a longitudinal axis of the spent nuclear fuel rod 36 to provide gamma ray photons at energies of about 10 MeV to about 15 MeV that burn fissile materials and that remain in the spent fuel rod 36 by photofission.

A typical spent fuel rod (~3.3 m long) consists of uranium oxide ceramic pellets approximately 1 cm in diameter and 1 cm in height. When fresh the UO2 is enriched to about 4% with 235U, but after the rod becomes too thermal neutron absorbent ('poisoned') to function, it still consists of about 1% thermally fissile atoms—mostly plutonium formed by neutron absorption from 238U. The greatest deposits are around the rim of the pellets that experience the greatest concentration of thermal neutrons. The major neutron absorbers that block the fission process have substantially no effect on gamma ray penetration into the spent nuclear fuel rod 36 in a direction along the longitudinal axis of the spent nuclear fuel rod 36. Unlike thermal neutrons, the gamma ray beam is not selectively absorbed by common neutron poisons, such as samarium and xenon.

Although a spent nuclear fuel rod is no longer is useful in a power-producing pile with its heavy buildup of neutron poisons, some thermal fissions occur if it is placed in a thermal neutron flux. Moreover it is not feasible to solely depend on laser-induced photofission to burn up $10^{23}$ atoms in any reasonable time. To be specific: suppose the laser has a 10 mJ pulse at a rate of 1/sec. Each spent 3.7 m long fuel rod has about $10^{23}$ thermally fissionable atoms left in it comprising about 1% of the number of atoms. Photofission cross sections for uranium isotopes as well as plutonium and the other actinides are about 0.3 barn at 10 MeV. Hence 92.7% of the photons are absorbed and a total of $5.79 \cdot 10^9$ photo-fissions per laser pulse are created. Of these about 1% are photofissions in the desired isotopes. Depending on the laser alone to split these atoms may lead to an unacceptably long process.

Therefore, one or more control rods of the plurality of control rods 37 can be removed from the nuclear reactor 34 until the nuclear reactor 34 is brought to near criticality so as to keep production of new fissile material to a minimum. The thermal neutrons generated by the active nuclear fuel rods 38 and the photofission reaction induced by the 10 MeV-15 MeV gamma ray FEL provide a fission gain (i.e., chain fission reaction) that can be controlled to increase the fission of the remaining fissile material and actinides in the spent nuclear fuel rod 36 at a reasonable rate such that the spent nuclear fuel rod 36 can be processed faster than depletion of the active fuel rods 38. Each photofission event triggers a number of thermal neutron generations determined by the control rods 37. Some fraction of the thermal neutron flux will induce splitting in remaining fissile atoms in the spent nuclear fuel rod 36, but is limited by the presence of neutron poisons.

For example suppose that G represents the thermal neutron 'gain' that follows fast neutron fission production in the spent rod from laser-induced fission. The total number of desired fissile atoms split per pulse becomes $0.01 \times 5.79 \times 10^9 \ast (1+G)$. According to the Department of Energy, a typical MWe power plant must replace 66 fuel rod assemblies, consisting of, say 90 rods, each year, for a total of 5940 rods. To keep up with this rate, the system would have to process one rod every 1.5 hours. This rate seems problematical because of the very high thermal neutron flux required. Therefore more than one of these installations will be needed for each power plant (of course, the laser pulse rate can be increased and more than one rod processed at a time). It is necessary to fission at least $10^{17}$ fissile atoms per shot if this spent fuel rod soaking process is to be practical. Assuming no absorption (neutron poisons), the minimum gain required is $1.73 \cdot 10^7$. A boiling water reactor (thermal efficiency: 0.7) would generate about 3.9 MW of electrical power at this fission rate. Now the soak time is 11.57 days. A 60 day soak time would run the reactor at a 750 kW electrical power rate. These soak times will increase (but the electrical power level will not) when full neutron poisoning is taken into account. Note that the power generation is about 1/1000 or less than that of a full power plant.

The nuclear reactor 34 is also employed as a power source for the gamma ray FEL 32. Therefore, the energy derived from the process of reducing the storage time of the spent nuclear fuel rod 36 can be employed to offset the energy cost of performing the process. The system 30 further includes a heat exchanger 40 coupled to the nuclear reactor 34, a turbine 42 coupled to the heat exchanger 40 and a generator 44 coupled to the turbine 42. The heat generated by the nuclear reactor 34 is captured by the heat exchanger 40 and employed to drive the turbine 42. The turbine 42 drives the generator 44 to provide electricity. The electricity is in turn utilized to power the gamma ray FEL 32.

Figure 6:
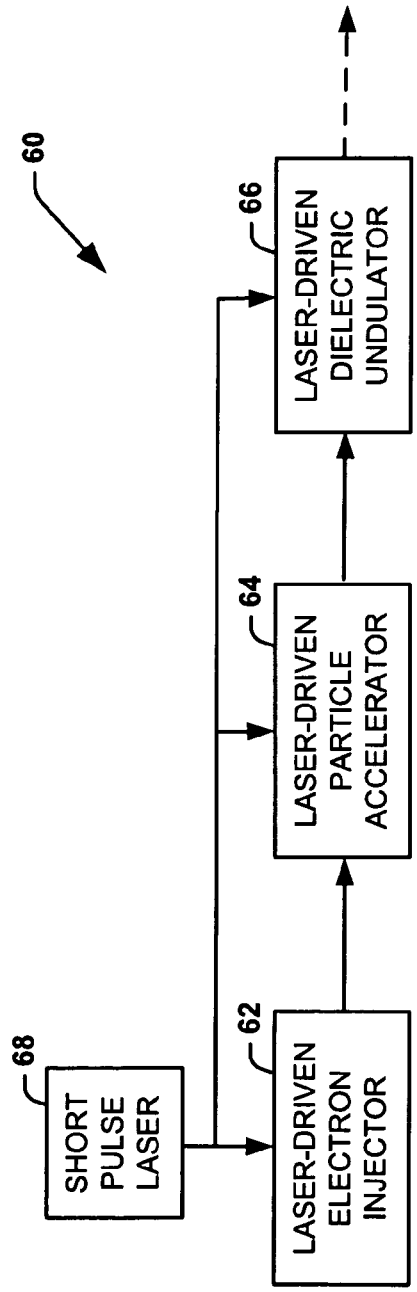
FIG. 6 illustrates a block diagram of a laser driven gamma ray self-amplified stimulated-emission (SASE) FEL in accordance with an aspect of the present invention.

FIG. 6 illustrates a block diagram of a laser driven gamma ray self-amplified stimulated-emission (SASE) FEL 60 in accordance with an aspect of the present invention. The gamma ray SASE FEL 60 can provide substantially collimated gamma ray photons with relatively narrow energy spectrum at energies of about 10 MeV to about 15 MeV. The gamma ray SASE FEL 60 includes a laser driven electron injector 62 that provides a source of electrons to a laser-driven particle accelerator 64. The laser-driven particle accelerator 64 accelerates the electrons to high speeds, which are then provided to a laser driven undulator 66. The laser-driven undulator 66 oscillates the accelerated electrons to generate substantially collimated high gamma ray photons at energies of about 10 MeV to about 15 MeV. The laser-driven electron injector 62 can include a field emission nanotip electron source driven by a short pulse laser 68. The short pulse laser 68 is also employed by the laser-driven particle accelerator 64 and the laser driven dielectric undulator 66 to generate the required electromagnetic fields to accelerate and oscillate the electrons that result in the production of substantially collimated gamma rays. A typical radio frequency (RF) driven gamma ray source can be several kilometers long. By employing a laser source to generate the required electromagnetic fields, the gamma ray SASE FEL 60 can be built with a length of about 1 to about 5 meters and therefore can be assembled on a tabletop.

A gamma ray FEL differs from other sources of 10-15 MeV photons in two respects its substantial collimation and its relatively narrow energy spectrum. Although a Linear Accelerator (LINAC) that generates 10 MeV-15 MeV photons could be used, the beams are quite divergent (relative to an FEL source) and have a wide energy spectrum. The skirts of the photofission cross section for the transuranics are steep so that photons with less than 10 MeV energy will create little photofission. Therefore, such a source substitution will greatly reduce the efficiency of the clean-up process.

Figure 7:
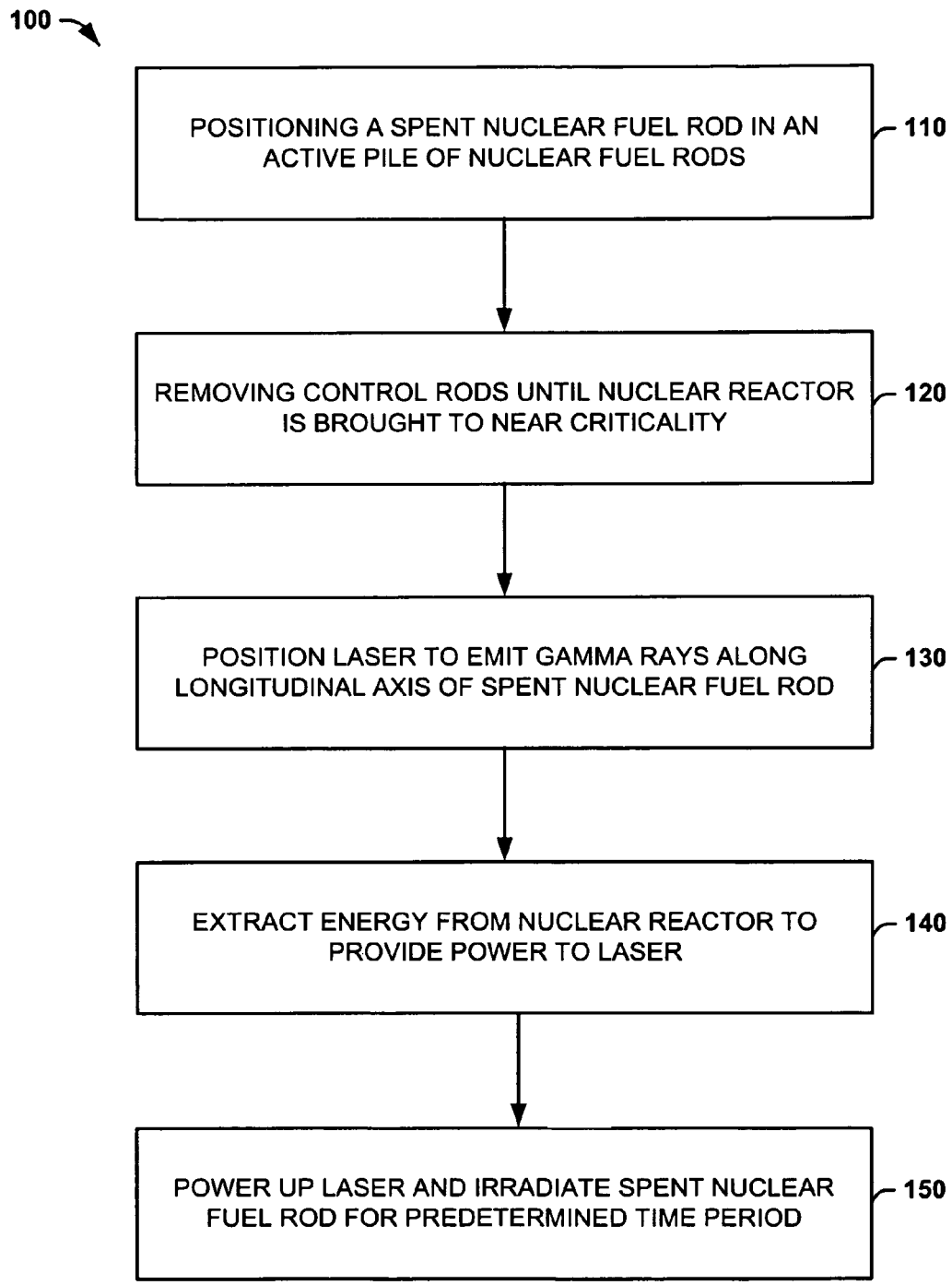
FIG. 7 illustrates a method for reducing the storage time of spent nuclear fuel rods in accordance with an aspect of the present invention.

In view of the foregoing structural and functional features described above, a methodology in accordance with various aspects of the present invention will be better appreciated with reference to FIG. 7. While, for purposes of simplicity of explanation, the methodology of FIG. 7 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 7 illustrates a method 100 for reducing the storage time of spent nuclear fuel rods in accordance with an aspect of the present invention. The method begins at 110 where a spent nuclear fuel rod is positioned in an active pile of nuclear fuel rods and control rods in a nuclear reactor. At 120, control rods are removed until the nuclear reactor is brought to near criticality, so as to keep production of new fissile material to a minimum. At 130, a gamma ray FEL is disposed spaced apart from the nuclear reactor and positioned to provide gamma ray photons having an energy of about 10 MeV to about 15 MeV along the longitudinal axis of the spent nuclear rod. At 140, energy is extracted from the nuclear reactor and converted to electricity to power the gamma ray FEL. At 150, the laser is powered up to irradiate the spent nuclear fuel rod for a predetermined time period concurrently with the thermal neutron bombardment by the active control rods.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method of reducing the storage time of spent nuclear fuel, the method comprising:
   providing a spent nuclear fuel rod; and
   irradiating, by a gamma ray free electron laser (FEL), the spent nuclear fuel rod along a longitudinal axis of the spent nuclear fuel rod with substantially collimated gamma ray photons having energy levels of about 10 MeV to about 15 MeV for a predetermined time period to initiate a photofission reaction in remaining fertile fissile material in the spent nuclear fuel rod.

2. A method of reducing the storage time of spent nuclear fuel, the method comprising:
   providing a sample of spent nuclear fuel; and
   placing the sample of spent nuclear fuel in a nuclear reactor with active nuclear material and control material; and
   removing portions of the control material until the reactor reaches near criticality;
   irradiating, after the removing, the spent nuclear fuel with substantially collimated gamma ray photons having energy levels of about 10 MeV to about 15 MeV for a predetermined time period to initiate a photofission reaction in remaining fertile fissile material in the spent nuclear fuel.

3. The method of claim 2, further comprising:
   extracting power from the nuclear reactor, wherein the extracted power includes power due to the photofission reaction;
   converting the power from the nuclear reactor into electricity; and
   employing the electricity to provide power to a gamma ray source that provides the substantially collimated gamma ray photons having energy levels of about 10 MeV to about 15 MeV.

4. The method of claim 3, wherein the gamma ray source is a gamma ray free electron laser (FEL).

5. The method of claim 4, wherein the predetermined time period is about 1 to about 10 hours.

6. A method of reducing the storage time of spent nuclear fuel rods, the method comprising:
   placing a spent nuclear fuel rod in a nuclear reactor with a plurality of active nuclear fuel rods and a plurality of control rods;
   removing one or more of the plurality of control rods until the reactor reaches near criticality; and
   irradiating the spent nuclear fuel rod, in the nuclear reactor, with substantially collimated gamma ray photons having energy levels of about 10 MeV to about 15 MeV for a predetermined time period to initiate a photofission reaction in remaining fertile fissile material in the spent nuclear fuel rod.

7. The method of claim 6, wherein the irradiating the spent nuclear fuel rod comprises irradiating the spent nuclear fuel rod along its longitudinal axis.

8. The method of claim 6, wherein the irradiating the spent nuclear fuel rod comprises irradiating the spent nuclear fuel rod with a gamma ray free electron laser (FEL).

9. The method of claim 6, further comprising:
   extracting power from the nuclear reactor that includes power due to the photofission reaction in the remaining fertile fissile material in the spent nuclear fuel rod;
   converting the power from the nuclear reactor into electricity; and
   employing the electricity to provide power to a gamma ray source that provides the substantially collimated gamma ray photons having energy levels of about 10 MeV to about 15 MeV.

10. The method of claim 9, wherein the gamma ray source is a gamma ray free electron laser (FEL).

11. The method of claim 10, wherein the predetermined time period is about 1 to about 10 hours.

12. The method of claim 2, further comprising extracting power from the nuclear reactor, wherein the extracted power includes power due to the photofission reaction.

13. The method of claim 6, further comprising extracting power from the nuclear reactor, wherein the extracted power includes power due to the photofission reaction.

* * * * *